(12) United States Patent
Bhatasana

(10) Patent No.: US 11,709,090 B2
(45) Date of Patent: Jul. 25, 2023

(54) TECHNIQUE TO IDENTIFY ANOMALY AMONGST BASE PROVER VOLUMES USING ESTIMATED UNCERTAINTY

(71) Applicant: Saudi Arabian Oil Company, Dhahran (SA)

(72) Inventor: Chandulal N Bhatasana, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 288 days.

(21) Appl. No.: 17/113,593

(22) Filed: Dec. 7, 2020

(65) Prior Publication Data

US 2022/0178733 A1 Jun. 9, 2022

(51) Int. Cl.
*G01F 25/10* (2022.01)
(52) U.S. Cl.
CPC ................................. *G01F 25/10* (2022.01)
(58) Field of Classification Search
CPC .......... G01F 25/10; G01F 25/11; G01F 1/667; G01F 25/13; G01F 25/15; G01F 1/00; G01F 1/66; G01F 25/00; G01F 1/125; G01F 1/36; G01F 15/024; G01F 25/0084; G01F 25/0092; G01F 1/88; G01F 1/74; G01F 1/668; G01F 1/663; G01F 1/383; B67D 7/085
See application file for complete search history.

(56) References Cited

U.S. PATENT DOCUMENTS

| | | | |
|---|---|---|---|
| 3,120,118 A * | 2/1964 | Boyle | G01F 25/11 15/104.062 |
| 4,106,328 A | 8/1978 | Neeff | |
| 4,481,805 A | 11/1984 | Dobesh | |
| 10,240,967 B2 | 3/2019 | Bhatasana | |
| 2011/0130997 A1* | 6/2011 | Day | G01F 25/11 73/1.16 |
| 2012/0186323 A1* | 7/2012 | Weaver | G01F 25/11 73/1.16 |
| 2018/0017428 A1* | 1/2018 | Wang | G01F 25/10 |
| 2019/0049001 A1* | 2/2019 | Harada | F15B 19/005 |

FOREIGN PATENT DOCUMENTS

| | | |
|---|---|---|
| GB | 2129569 A | 5/1984 |
| KR | 20110077747 A | 7/2011 |

* cited by examiner

*Primary Examiner* — Yoshihisa Ishizuka
*Assistant Examiner* — Carter W Ferrell
(74) *Attorney, Agent, or Firm* — Dinsmore & Shohl LLP

(57) ABSTRACT

A system for identifying an anomaly in flow meter proving equipment includes four detectors D1, D2, D3, and D4. A data acquisition and monitoring system is configured to signals from D1, D2, D3, and D4 to measure flow volumes between D1 and D3 as a measured volume Va, between D2 and D4 as a measured volume Vb, between D2 and D3 as a measured volume Vc, and between D1 and D4 as a measured volume Vd. The data acquisition and monitoring system calculates Va+Vb−Vc−Vd plus a max uncertainty as an upper range value and Va+Vb−Vc−Vd minus the max uncertainty as a lower range value. The data acquisition and monitoring system identifies an anomaly in response to the upper range value being less than zero or the lower range value being greater than zero and initiates recalibration of the prover in response to the identifying of the anomaly.

15 Claims, 4 Drawing Sheets

US 11,709,090 B2

TECHNIQUE TO IDENTIFY ANOMALY AMONGST BASE PROVER VOLUMES USING ESTIMATED UNCERTAINTY

TECHNICAL FIELD

The present specification generally relates to measuring flow rates of fluids and, more specifically, systems and methods for proving accuracy for fluid flow meters and identifying anomalies in flow meter proving systems.

BACKGROUND

For pipeline systems transporting fluid hydrocarbons or marine terminals for loading fluid hydrocarbon cargo, it is important to measure volumetric flow accurately as ownership of the goods changes and money changes hands. The accuracy of flow meters, such as turbine meters, positive displacement meters, and other meters, can be affected due to variations in characteristics of the fluid to be measured, changes in operating process conditions, and life cycle of the flow meter. A meter prover is used to determine the accuracy of the flow meter by providing measurements used to determine a meter factor (MF). However, meter proving equipment can also malfunction. Malfunctions may occur due to mechanical failure or operator error, causing incorrect measurements that lead to an incorrect meter factor. Because of the large volumes of hydrocarbons that are transported around the world, even small inaccuracies can lead to large accumulations of error.

Accordingly, a need exists for systems and methods for proving accuracy of meter provers and identifying anomalies in flow meter proving systems.

SUMMARY

In one embodiment, a system for identifying an anomaly in flow meter proving equipment includes four detectors D1, D2, D3, and D4. A data acquisition and monitoring system is in communication with D1, D2, D3, and D4 during prover calibration process. The data acquisition and monitoring system is configured to perform steps of receiving signals from detectors D1, D2, D3 and D4 on the prover and, using the received signals, measure a volume between the detectors D1 and D3 as a measured volume Va, measure a volume between the detectors D2 and D4 as a measured volume Vb, measure a volume between the detectors D2 and D3 as a measured volume Vc, and measure a volume between the detectors D1 and D4 as a measured volume Vd. The data acquisition and monitoring system is further configured to calculate Va+Vb−Vc−Vd plus a max uncertainty as an upper range value, identify an anomaly in response to the upper range value being less than zero, and initiate recalibration of the prover in response to the identifying of the anomaly.

In another embodiment, the data acquisition and monitoring system is further configured to perform steps of calculating Va+Vb−Vc−Vd minus the max uncertainty as a lower range value and identifying an anomaly in response to the lower range value being greater than zero.

In yet another embodiment, the detectors are arranged on a prover such that a true volume of the prover between D1 and D3 is BPVA, a true volume of the prover between D2 and D4 is BPVB, a true volume of the prover between D2 and D3 is BPVC, a true volume of the prover between D1 and D4 is BPVD, and BPVA+BPVB−BPVC−BPVD=0.

In yet another embodiment, an uncertainty Ua includes a maximum expected difference between Va and BPVA, an uncertainty Ub includes a maximum expected difference between Vb and BPVB, an uncertainty Uc includes a maximum expected difference between Vc and BPVC, an uncertainty Ud includes a maximum expected difference between Vd and BPVD, and the max uncertainty includes Ua+Ub+Uc+Ud.

In yet another embodiment, each of Ua, Ub, Uc, and Ud comprises between 0.01% and 0.05% of the respective measured volumes Va, Vb, Vc, and Vd.

In yet another embodiment, the measuring of the measured volumes Va, Vb, Vc, and Vd includes performing three or more measurements for each flow volume in a forward prover flow direction and determining an average of the three or more measurements as the respective measured volumes Va, Vb, Vc, and Vd.

In yet another embodiment, the measuring of the measured volumes Va, Vb, Vc, and Vd includes performing three or more measurements for each flow volume in a reverse prover flow direction and determining an average of the three or more measurements as the respective measured volumes Va, Vb, Vc, and Vd.

In another embodiment, a method for identifying an anomaly in flow meter proving equipment includes using flow meter proving equipment including four detectors D1, D2, D3, and D4. The method includes receiving signals from detectors D1, D2, D3 and D4 on a prover, and using the received signals to measure a flow volume between the detectors D1 and D3 as a measured volume Va, measure a flow volume between the detectors D2 and D4 as a measured volume Vb, measure a flow volume between the detectors D2 and D3 as a measured volume Vc, and measure a flow volume between the detectors D1 and D4 as a measured volume Vd. The method further includes calculating Va+Vb−Vc−Vd plus a max uncertainty as an upper range value, identifying an anomaly in response to the upper range value being less than zero, and initiating recalibration of the prover in response to the identifying of the anomaly.

In yet another embodiment, the method further includes calculating Va+Vb−Vc−Vd minus the max uncertainty as a lower range value, and identifying an anomaly in response to the lower range value being greater than zero.

In yet another embodiment, the method includes arranging the detectors on a prover such that a true volume of the prover between D1 and D3 is BPVA, a true volume of the prover between D2 and D4 is BPVB, a true volume of the prover between D2 and D3 is BPVC, a true volume of the prover between D1 and D4 is BPVD, and BPVA+BPVB−BPVC−BPVD=0.

In yet another embodiment, an uncertainty Ua comprises a maximum expected difference between Va and BPVA, an uncertainty Ub comprises a maximum expected difference between Vb and BPVB, an uncertainty Uc comprises a maximum expected difference between Vc and BPVC, an uncertainty Ud comprises a maximum expected difference between Vd and BPVD, and the max uncertainty comprises Ua+Ub+Uc+Ud.

In yet another embodiment, each of Ua, Ub, Uc, and Ud comprises between 0.01% and 0.05% of the respective measured volumes Va, Vb, Vc, and Vd.

In yet another embodiment, the measuring of the measured volumes Va, Vb, Vc, and Vd includes performing three or more measurements for each flow volume in a forward prover flow direction, and determining an average of the three or more measurements as the respective measured volumes Va, Vb, Vc, and Vd.

In yet another embodiment, the measuring of the measured volumes Va, Vb, Vc, and Vd includes performing three or more measurements for each flow volume in a reverse prover flow direction and determining an average of the three or more measurements as the respective measured volumes Va, Vb, Vc, and Vd.

In another embodiment, a non-volatile computer readable medium storing instruction that, when executed by a processor, causes the processor to perform steps of any of the described embodiments.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
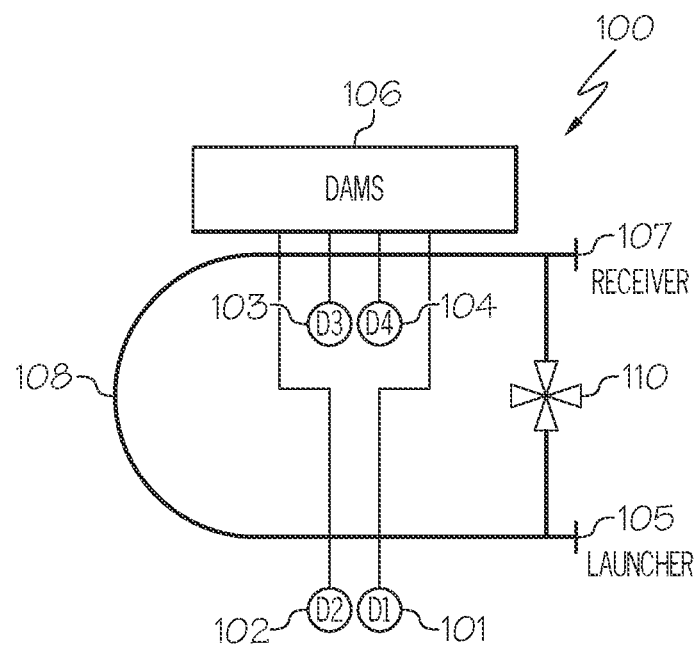
FIG. 1 illustrates a schematic diagram of a prover system with four detectors, according to one or more embodiments shown and described herein.

The disclosed embodiments relate to systems and methods that ensure proper functioning of meter proving systems used for proving the accuracy of fluid flow meters. Meter proving systems in the U.S. and internationally are guided by The American Petroleum Institute Manual of Petroleum Measurement Standards (hereafter "API MPMS"), chapter 4-Proving Systems, section 2, Displacement Provers ("API MPMS 4.2"). Meter proving using a bidirectional sphere prover is approved by this API Standard. This application refers to API MPMS Third Edition, September 2003, Reaffirmed—March 2011, which is incorporated herein by reference. The described embodiments are applicable to a bidirectional proving system. However, the principles and systems described are also applicable for unidirectional pipe provers and piston provers. Although one intended application of the teachings herein is systems for measuring the flow of hydrocarbons, the principles described herein are generally applicable to proving systems related to measuring any fluid flow.

A typical bidirectional sphere prover has a length of metering pipe through which the sphere travels back and forth, actuating a detector at each end of the calibrated section. A data acquisition and monitoring system (DAMS) totalizes flow measured by a flow meter when the sphere passes between a detector at one end of the calibration section and a detector at the other end of the calibration section. This reading is compared with a known volume of the metering pipe between the detectors to provide accurate calibration data. The calibration data may comprise a meter factor. The accuracy of the meter factor directly depends on the accuracy of volume between the two detectors.

According to paragraphs 2.9 and 3.8 of API MPMS, provers typically include two detector switches. The calibrated volume between the two detector switches is known as the Base Prover Volume (BPV) which is used to calculate a meter factor. According to embodiments disclosed herein, additional detectors may be provided for more than one calibrated BPV that can be used as back up or to improve accuracy of BPV measurements. Accuracy of the meter factor directly depends on accuracy of BPV measurements. According to embodiments disclosed herein, four detectors are used to derive four different BPVs. API MPMS 4.9 and API MPMS 12.2 provide a method and calculation procedure to derive BPV of the prover using just two detectors. However, API MPMS does not provide guidelines to identify any inconsistency within multiple BPVs, and a standard industry practice does not exist.

In general, it is an objective of the present application to provide a novel method, that employs estimated uncertainty in multiple BPVs, to identify an anomaly amongst these BPV, which helps to reduce error in measurements. The present disclosure provides systems and methods to identify an anomaly amongst four BPVs derived using four detectors. The disclosed principles are applicable and can be expanded appropriately for more than four detectors and more than four BPVs.

FIG. 1 illustrates a schematic diagram of a prover system with four detectors, according to one or more embodiments shown and described herein. A prover system 100 is illustrated in FIG. 1. According to some embodiments, the prover system 100 comprises a bidirectional prover system. The prover system 100 may include a metering pipe 108 and four detectors 101, 102, 103, and 104 arranged along the metering pipe 108. The prover system 100 may further include a launcher 105 and a receiver 107. In calibrating the prover system 100, a sphere (not shown) is sent back and forth through the metering pipe 108 between the launcher 105 and receiver 107 while a calibration fluid flows through the prover system 100. As the calibration fluid flows through the prover system 100, the sphere triggers the detectors 101, 102, 103, 104 which indicate to the data acquisition and monitoring system (DAMS) 106 how to totalize the flow through the prover in the case of master meter calibration or operate a diverter solenoid valve in the case of a water draw calibration. According to some embodiments, the DAMS 106 measures up to four Base Prover Volumes (BPVs). Flow through the prover system 100 may be managed by a four-way valve 110. According to some embodiments, the DAMS 106 may be a computing device, including a device comprising a processor and memory, or a solid state device comprising logic gates configured to perform the functions described herein. An embodiment of the DAMS 106 is described in greater detail with reference to FIG. 6. The proving system 100 is illustrated in a simplified diagram in FIGS. 2-4.

Figure 2:
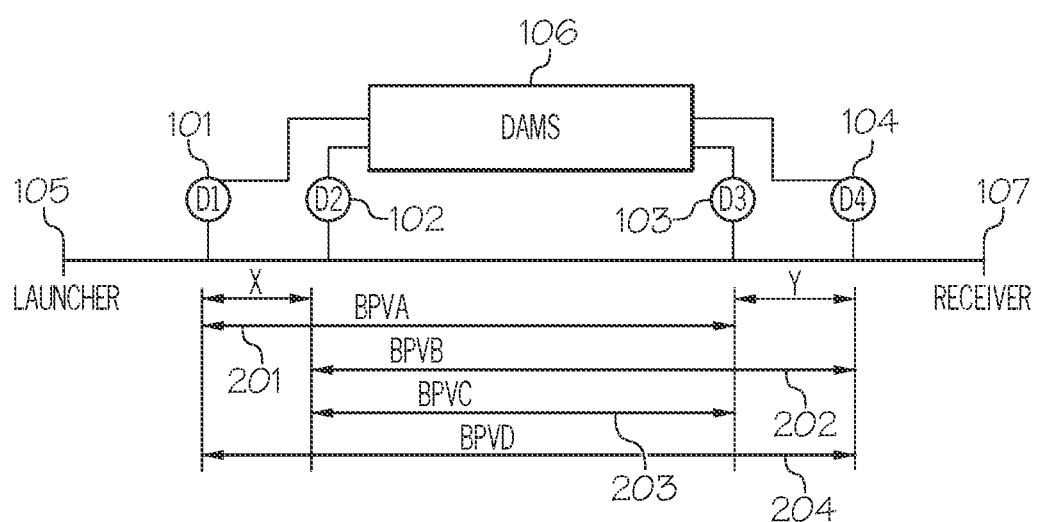
FIG. 2 illustrates a diagram of a prover system for identifying an anomaly in meter proving equipment and corresponding true volumes between four detectors, according to one or more embodiments shown and described herein.

FIG. 2 illustrates a diagram of a prover system for identifying an anomaly in flow meter proving equipment and corresponding volumes detectable using four detectors, according to one or more embodiments shown and described herein.

According to embodiments, the four detectors may be used to define four BPVs. A volume between detector D1 101 and detector D3 103 may be identified as BPVA 201. A volume between detector D2 102 and detector D4 104 may be identified as BPVB 202. A volume between detector D2 102 and detector D3 103 may be identified as BPVC 203. A volume between detector D1 101 and detector D4 104 may be identified as BPVD 204. The volumes BPVA 201, BPVB 202, BPVC 203, and BPVD 204 represent the true BPVs without any uncertainty. A volume between detector D1 101 and detector D2 102 is not typically derived during the calibration process, but may be identified as X. Likewise, a volume between detector D3 103 and detector D4 104 is not typically derived during calibration, but may be identified as Y.

Throughout this application, specific examples of the disclosed embodiments and specific scenarios of measured values and measurement errors are illustrated in the figures. In addition, various generalized equations are presented, which apply to the figures but are not limited to the embodiments and scenarios depicted in the figures. Therefore, equations of this application are presented without specific references to the figures. In a generalized system of the disclosed embodiments employing four detectors, the value of X can be derived by:

$$X = BPVA - BPVC \qquad \text{Eq1}$$

Or $$X = BPVD - BPVB \qquad \text{Eq2}$$

If the true volumes BPVA 201, BPVB 202, BPVC 203, and BPVD 204 were derived during calibration of the prover system 100, the value X obtained by Eq1 and Eq2 will be the same:

$$BPVA - BPVC = BPVD - BPVB$$

Algebraically rearranging this equality produces:

$$BPVA + BPVB - BPVC - BPVD = 0 \qquad \text{Eq3}$$

According to embodiments, when measuring BPVA 201, BPVB 202, BPVC 203, and BPVD 204, the proving system 100 may launch a sphere from the launcher 105, which will pass and trigger each of the detectors D1 101, D2 102, D3 103, and D4 104 before arriving at the receiver 107. As each detector is triggered, each detector sends a signal to the data acquisition and monitoring system (DAMS) 106. The DAMS 106 may perform the totalization of fluid flow in the proving system 100 based on the signals received from the detectors 101, 102, 103, and 104 or operate a diverter solenoid valve. Any measurement is subject to some amount of uncertainty. According to the International Organization for Standardization (ISO 5168), uncertainty is a parameter, associated with the result of measurement, that characterizes the dispersion of the values that could reasonably be attributed to the measurand. Therefore, measurements of BPVA 201, BPVB 202, BPVC 203, and BPVD 204 will be associated with some amount of uncertainty, described and illustrated further with reference to FIG. 3.

Figure 3:
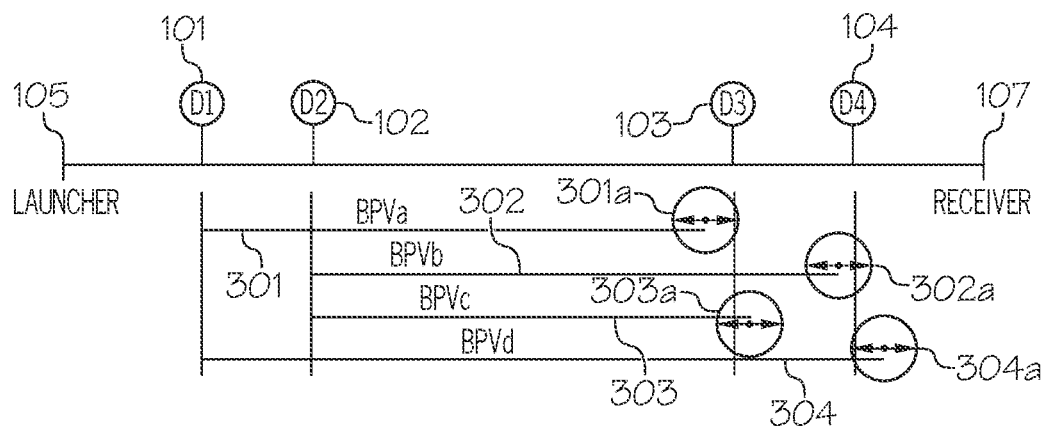
FIG. 3 illustrates a diagram of a prover and corresponding uncertainty ranges for measured volumes detected using four detectors, according to one or more embodiments shown and described herein.

FIG. 3 illustrates a diagram of a prover system and corresponding uncertainty ranges for volumes detectable using four detectors, according to one or more embodiments shown and described herein. Uncertainty of a measured volume refers to an interval around the measured volume such that any repetition of the measurement will produce a new result that lies within the interval. Uncertainty defines a statistical interval around the measured volume within which true volume is expected to lie. The proper determination of an uncertainty for proving systems is described in API MPMS 13.3. As a non-limiting example, uncertainty may be determined based on repeatability of measurements.

A measurement of the volume BPVA 201 may be identified as BPVa 301. Because of the uncertainty associated with the measured volume BPVa 301, the true volume BPVA 201 is expected to fall within the uncertainty range of the measured volume BPVa 301. The uncertainty Ua 301a corresponding to the measured volume BPVa 301 is illustrated as double arrows surrounded by a circle. In general, the uncertainties Ua 301a, Ub 302a, Uc 303a, and Ud 304a correspond to the radius of the circle and the double arrows indicate that the uncertainties may be in the positive and negative directions. A measurement of the volume BPVB 202 may be identified as BPVb 302 with a corresponding uncertainty Ub 302a. A measurement of the volume BPVC 203 may be identified as BPVc 303 with a corresponding uncertainty Uc 303a. A measurement of the volume BPVD 204 may be identified as BPVd 304 with a corresponding uncertainty Ud 304a. Each of Ua 301a, Ub 302a, Uc 303a, and Ud 304a are estimated values of uncertainty in the respective measured volumes BPVa 301, BPVb 302, BPVc 303, and BPVd 304. BPVa 301, BPVb 302, BPVc 303, and BPVd 304 may be referred to as Va, Vb, Vc, and Vd respectively. In FIG. 3, the true volumes BPVA 201, BPVB 202, BPVC 203, and BPVD 204 are indicated by a vertical line beneath each of detector D3 103 and detector D4 104. Each of the true volumes BPVA 201, BPVB 202, BPVC 203, and BPVD 204 lies within the uncertainty ranges Ua 301a, Ub 302a, Uc 303a, and Ud 304a of the corresponding measured volumes BPVa 301, BPVb 302, BPVc 303, and BPVd 304.

Because measured volumes BPVa 301, BPVb 302, BPVc 303, and BPVd 304 are unlikely to be exactly identical to the true volumes BPVA 201, BPVB 202, BPVC 203, and BPVD 204, BPVa+BPVb−BPVc−BPVd is unlikely to be equal to zero.

$$BPVa + BPVb - BPVc - BPVd \neq 0 \qquad \text{Eq4}$$

Figure 4:
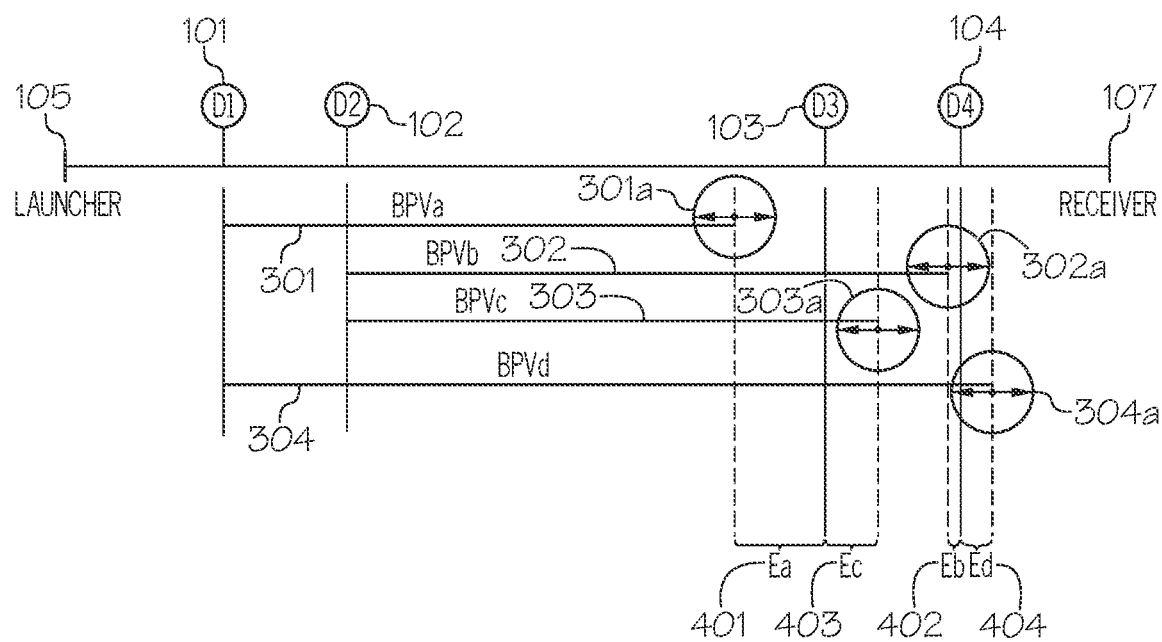
FIG. 4 illustrates a diagram of a prover, corresponding uncertainty ranges, and measurement errors for measured volumes detected using four detectors, according to one or more embodiments shown and described herein.

FIG. 4 illustrates a diagram of a prover system, corresponding uncertainty ranges, and measurement errors for volumes detectable using four detectors, according to one or more embodiments shown and described herein. When taking measurements of the BPVs, a measurement error may be greater than the uncertainty. However, because the true volumes BPVA 201, BPVB 202, BPVC 203, and BPVD 204 are not precisely known, it is not always known whether the measured volumes BPVa 301, BPVb 302, BPVc 303, and BPVd 304 are within the uncertainty ranges Ua 301a, Ub 302a, Uc 303a, and Ud 304a. FIG. 4 illustrates a situation where an error associated with some measurements of BPVs is beyond the uncertainty range.

Referring to FIG. 4, the measured volume BPVa 301 has a corresponding error Ea 401 that is greater than the uncertainty Ua 301a. The error Ea 401 is a difference between the true volume BPVA 201 and the measured volume BPVa 301. This relationship can be generally expressed as:

$$BPVA = BPVa + Ea$$

$$BPVB = BPVb + Eb$$

$$BPVC = BPVc + Ec$$

$$BPVD = BPVd + Ed$$

Under normal circumstances, the measurement errors Ea 401, Eb 402, Ec 403, and Ed 404 are less than the uncertainties Ua 301a, Ub 302a, Uc 303a, and Ud 304a.

$$Ua \geq Ea$$

$$Ud \geq Ed$$

$$Uc \geq Ec$$

$$Ub \geq Eb$$

In FIG. 4, the error Eb 402 corresponding to the measured volume BPVb 302 is smaller than the uncertainty Ub 302a, and the error Ed 404 corresponding to the measured volume BPVd 304 is smaller than the uncertainty Ud 304a. However, the error Ec 403 corresponding to the measured volume BPVc 303 is greater than the uncertainty Uc 303a. Thus, the errors Ea 401 and Ec 403 associated with measured volumes BPVa 301 and BPVc 303 are outside the uncertainty ranges Ua 301a and Uc 303a. Each of the measured volumes BPVa 301, BPVb 302, BPVc 303, and BPVd 304 in FIG. 4 is indicated with a dashed vertical line. The true volumes BPVA 201, BPVB 202, BPVC 203, and BPVD 204 are indicated with a solid vertical line below detectors D3 103 and D4 104. As illustrated in FIG. 4, the uncertainty ranges Ua 301a and Uc 303a do not overlap the solid vertical lines beneath detectors D3 103 and D4 104.

When the error Ea 401 is greater than the uncertainty Ua 301a, the error Ea 401 is denoted $E_{AA}$. When the error Eb 402 is greater than the uncertainty Ub 302a, the error Eb 402 is denoted $E_{BB}$. When the error Ec 403 is greater than the uncertainty Uc 303a, the error Ec 403 is denoted $E_{CC}$. When the error Ed 404 is greater than the uncertainty Ud 304a, the error Ed 404 is denoted $E_{DD}$.

Because the errors Ea 401, Eb 402, Ec 403, and Ed 404 are the differences between the true volumes BPVA 201, BPVB 202, BPVC 203, and BPVD 204 and the measured volumes BPVa 301, BPVb 302, BPVc 303, and BPVd 304, Eq4 may be expressed in terms of the true volumes:

$$(BPVA+Ea)+(BPVB+Eb)-(BPVC+Ec)-(BPVD+Ed) \quad \text{Eq5}$$

The errors Ea 401, Eb 402, Ec 403, and Ed 404 may be positive or negative. Therefore, Eq5 may take on a range of both positive and negative values. As long as the errors are within the uncertainty range, the volume measurements are within acceptable limits. Therefore, the maximum positive value of Eq5 that is within the acceptable uncertainty range occurs when $$Ea=Ua$$

$$Eb=Ub$$

$$Ec=-Uc$$

$$Ed=-Ud$$

Therefore, the maximum acceptable value for Eq5 may be expressed as $$(BPVA+Ua)+(BPVB+Ub)-(BPVC-Uc)-(BPVD-Ud) \quad \text{Eq6}$$

This simplifies to $$= BPVA + BPVB - BPVC - BPVD + Ua + Ub + Uc + Ud \quad \text{Eq 6}$$

$$= 0 + Ua + Ub + Uc + Ud \quad \text{Eq 6}$$

Therefore, the maximum possible positive value of Eq5 while still being within the acceptable uncertainty is Ua+Ub+Uc+Ud.

The maximum negative value of Eq5 that is within the acceptable uncertainty range occurs when $$Ea=-Ua$$

$$Eb=-Ub$$

$$Ec=Uc$$

$$Ed=Ud$$

Therefore, the maximum possible negative acceptable value for Eq5 may be expressed as $$(BPVA-Ua)+(BPVB-Ub)-(BPVC+Uc)-(BPVD+Ud) \quad \text{Eq7}$$

This simplifies to $$= BPVA + BPVB - BPVC - BPVD - Ua - Ub - Uc - Ud \quad \text{Eq 7}$$

$$= -(Ua + Ub + Uc + Ud) \quad \text{Eq 7}$$

Therefore, the most negative value of Eq5 while still being within the acceptable uncertainty is −Ua−Ub−Uc−Ud. Based on Eq6 and Eq7, all acceptable values for Eq5 and thus Eq4 will be between negative (Ua+Ub+Uc+Ud) and positive (Ua+Ub+Uc+Ud).

$$-(Ua+Ub+Uc+Ud) \leq BPVa+BPVb-BPVc-BPVd \leq (Ua+Ub+Uc+Ud)$$

Although the exact true volumes BPVA 201, BPVB 202, BPVC 203, and BPVD 204 and errors Ea 401, Eb 402, Ec 403, and Ed 404 are unknown, the uncertainties Ua 301a, Ub 302a, Uc 303a, and Ud 304a are known and may be derived using standard procedures described in API MPMS 13.3. The measured volumes BPVa 301, BPVb 302, BPVc 303, and BPVd 304 may be used in combination with the known uncertainties Ua 301a, Ub 302a, Uc 303a, and Ud 304a to detect an anomaly.

By subtracting (Ua+Ub+Uc+Ud) from Eq4, and checking the result, an anomaly can be detected where at least one of Ea 401, Eb 402, Ec 403, or Ed 404 is greater than the corresponding uncertainties Ua 301a, Ub 302a, Uc 303a, or Ud 304a.

$$BPVa+BPVb-BPVc-BPVd \leq (Ua+Ub+Uc+Ud) \quad \text{Eq8}$$

$$BPVa+BPVb-BPVc-BPVd-(Ua+Ub+Uc+Ud) \leq 0 \quad \text{Eq8}$$

Under normal circumstances, Eq8 should evaluate to less than or equal to zero, even when the errors Ea 401, and Eb 402 are positive and errors Ec 403 and Ed 404 are negative. If Eq8 evaluates to greater than zero, at least one of Ea 401, Eb 402, Ec 403, or Ed 404 is greater than the corresponding uncertainties Ua 301a, Ub 302a, Uc 303a, or Ud 304a. This is shown below, where Eq8 evaluates to greater than zero, indicating an anomaly condition.

$$(BPVA+Ea)+(BPVB+Eb)-(BPVC-Ec)-(BPVD-Ed)-(Ua+Ub+Uc+Ud)>0 \quad \text{Eq9}$$

$$BPVA+BPVB+BPVC+BPVD+Ea+Eb+Ec+Ed-(Ua+Ub+Uc+Ud)>0 \quad \text{Eq9}$$

$$(Ea+Eb+Ec+Ed)-(Ua+Ub+Uc+Ud)>0 \quad \text{Eq9}$$

$$(Ea+Eb+Ec+Ed)>(Ua+Ub+Uc+Ud) \quad \text{Eq9}$$

As long as each of the errors Ea 401, Eb 402, Ec 403, and Ed 404 is less than or equal to the corresponding uncertainties Ua 301a, Ub 302a, Uc 303a, and Ud 304a, Eq9 is untrue. However, if the sum of uncertainties Ua 301a, Ub 302a, Uc 303a, and Ud 304a is subtracted from Eq4 (BPVa+BPVb−BPVc−BPVd), and the result remains greater than zero, then Eq9 is true and an anomaly exists where at least one of the errors Ea 401, Eb 402, Ec 403, and Ed 404 is greater than the corresponding uncertainties Ua 301a, Ub 302a, Uc 303a, and Ud 304a.

By adding (Ua+Ub+Uc+Ud) to Eq4, and checking the result, an anomaly can be detected where at least one of Ea 401, Eb 402, Ec 403, or Ed 404 has a magnitude greater than the corresponding uncertainties Ua 301a, Ub 302a, Uc 303a, or Ud 304a.

$$-(Ua+Ub+Uc+Ud) \leq \text{BPVa+BPVb−BPVc−BPVd} \quad \text{Eq10}$$

$$0 \leq \text{BPVa+BPVb−BPVc−BPVd}+(Ua+Ub+Uc+Ud) \quad \text{Eq10}$$

Under normal circumstances, Eq10 should evaluate to greater than or equal to zero, even when the errors Ea 401, and Eb 402 are negative and errors Ec 403 and Ed 404 are positive. If Eq10 evaluates to less than zero, at least one of Ea 401, Eb 402, Ec 403, or Ed 404 has a magnitude greater than the corresponding uncertainties Ua 301a, Ub 302a, Uc 303a, or Ud 304a. This is shown below, where Eq10 evaluates to less than zero, indicating an anomaly condition.

$$Ua+Ub+Uc+Ud+(\text{BPVA}-Ea)+(\text{BPVB}-Eb)-(\text{BPVC}+Ec)-(\text{BPVD}+Ed)<0 \quad \text{Eq11}$$

$$(Ua+Ub+Uc+Ud)+\text{BPVA+BPVB+BPVC+BPVD}-(Ea+Eb+Ec+Ed)<0 \quad \text{Eq11}$$

$$(Ua+Ub+Uc+Ud)-(Ea+Eb+Ec+Ed)<0 \quad \text{Eq11}$$

$$(Ua+Ub+Uc+Ud)<(Ea+Eb+Ec+Ed) \quad \text{Eq11}$$

Eq11 is equivalent to Eq9 and shows that, as long as each of the errors Ea 401, Eb 402, Ec 403, and Ed 404 is less than or equal to the corresponding uncertainties Ua 301a, Ub 302a, Uc 303a, and Ud 304a, Eq11 is untrue. However, if the sum of uncertainties Ua 301a, Ub 302a, Uc 303a, and Ud 304a is added to Eq4 (BPVa+BPVb−BPVc−BPVd), and the result remains less than zero, then an anomaly exists where, according to Eq11 at least one of the errors Ea 401, Eb 402, Ec 403, and Ed 404 has a magnitude greater than the corresponding uncertainties Ua 301a, Ub 302a, Uc 303a, and Ud 304a.

Thus, an anomaly can be detected if

BPVa+BPVb−BPVc−BPVd+(Ua+Ub+Uc+Ud)<0 Or

BPVa+BPVb−BPVc−BPVd−(Ua+Ub+Uc+Ud)>0

Figure 5:
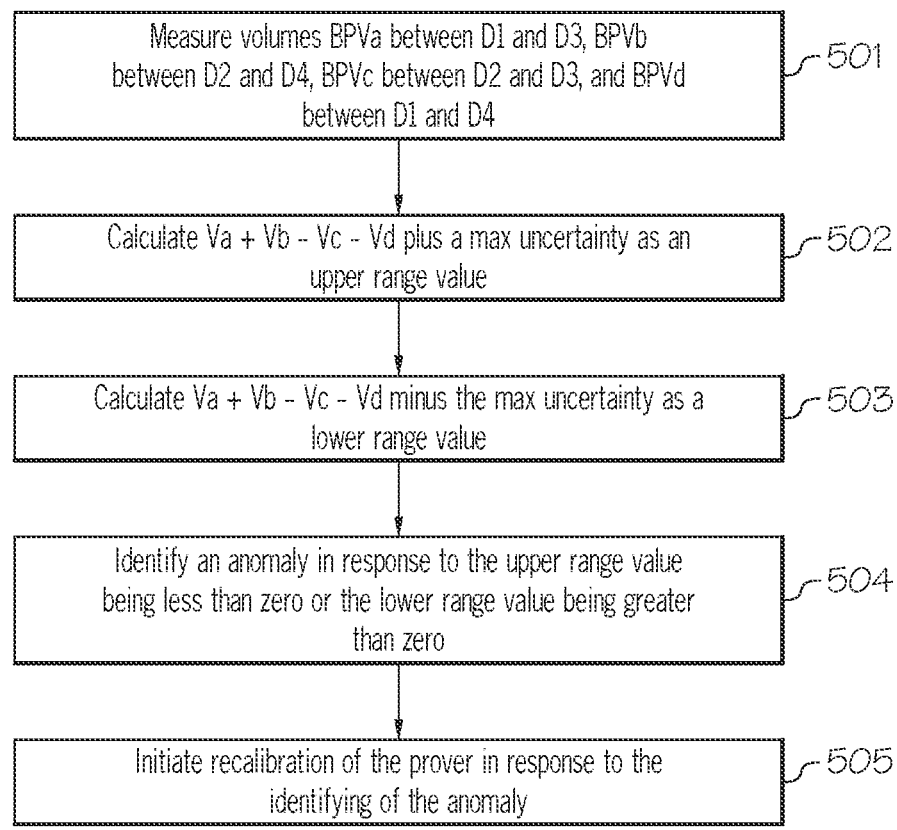
FIG. 5 illustrates a flow chart for a method of identifying an anomaly in flow meter proving equipment according to one or more embodiments shown and described herein.

FIG. 5 illustrates a flow chart for a method of identifying an anomaly in flow meter proving equipment according to one or more embodiments shown and described herein. The method of FIG. 5 may be applied to a prover system 100 to identify an anomaly condition where one or more of the errors Ea 401, Eb 402, Ec 403, and Ed 404 is greater than the corresponding uncertainties Ua 301a, Ub 302a, Uc 303a, and Ud 304a. The method of FIG. 5 may be implemented using a data acquisition and monitoring system (DAMS) 106.

At step 501, the DAMS 106 measures base prover volumes Va between D1 and D3, Vb between D2 and D4, Vc between D2 and D3, and Vd between D1 and D4. Measured volume Va corresponds to BPVa 301. Measured volume Vb corresponds to BPVb 302. Measured volume Vc corresponds to BPVc 303. Measured volume Vd corresponds to BPVd 304. The base prover volumes may be measured by any method. According to some embodiments, the base prover volumes may be measured using a master flow meter method while a fluid flows through the metering pipe 108. According to some embodiments, the base prover volumes may be measured by directing flow of the prover onto a mass or weight scale or volumetric measure.

According to some embodiments, the prover system may be a bidirectional prover system. The base prover volumes may be measured by performing three or more measurements for each flow volume in a forward prover flow direction. The volumes Va, Vb, Vc, and Vd may be determined by an average of the three or more measurements. Those of ordinary skill in the art will understand that the principles described herein are applicable to unidirectional pipe provers and piston provers, and any number of measurements may be taken in order to determine the measured volumes Va, Vb, Vc, and Vd.

At step 502, the DAMS 106 calculates Va+Vb−Vc−Vd plus a max uncertainty as an upper range value. According to some embodiments, the max uncertainty may comprise the sum of uncertainties corresponding to each measured volume. According to a non-limiting example, the max uncertainty may comprise the sum of Ua 301a, Ub 302a, Uc 303a, and Ud 304a:

Max Uncertainty=$Ua+Ub+Uc+Ud$

Upper Range Value=$Va+Vb-Vc-Vd$+Max Uncertainty

At step 503, the DAMS 106 calculates Va+Vb−Vc−Vd minus the max uncertainty as a lower range value.

Lower Range Value=$Va+Vb-Vc-Vd$−Max Uncertainty

At step 504, the DAMS 106 may identify an anomaly in response to the upper range value being less than zero or the lower range value being greater than zero. As described above, in relation to FIG. 4, after adding the max uncertainty, the resulting upper range value is guaranteed to be greater than or equal to zero if all measurement errors Ea 401, Eb 402, Ec 403, and Ed 404 are less than or equal to the corresponding uncertainties Ua 301a, Ub 302a, Uc 303a, and Ud 304a. If the upper range value is less than zero, this indicates an anomaly where at least one of the measurement errors Ea 401, Eb 402, Ec 403, or Ed 404 is greater than the corresponding uncertainties Ua 301a, Ub 302a, Uc 303a, and Ud 304a.

Likewise, after subtracting the max uncertainty, the resulting lower range value is guaranteed to be less than or equal to zero if all measurement errors Ea 401, Eb 402, Ec 403, and Ed 404 are less than or equal to the corresponding uncertainties Ua 301a, Ub 302a, Uc 303a, and Ud 304a. If the lower range value is greater than zero, this indicates an anomaly where at least one of the measurement errors Ea 401, Eb 402, Ec 403, or Ed 404 is greater than the corresponding uncertainties Ua 301a, Ub 302a, Uc 303a, and Ud 304a.

At step 505, the DAMS 106 initiates recalibration of the prover in response to the identifying of the anomaly. Because the identified anomaly indicates an error beyond acceptable limits, recalibration is recommended. Initiating recalibration may include resetting a flow totalizer to zero, and moving the proving sphere to either the launcher 105 or the receiver 107. Measurement errors beyond acceptable limits may occur because of an operator error or a malfunction of the proving system 100. If anomalies persist after multiple recalibrations, one or more components of the proving system may require repair or replacement.

Figure 6:
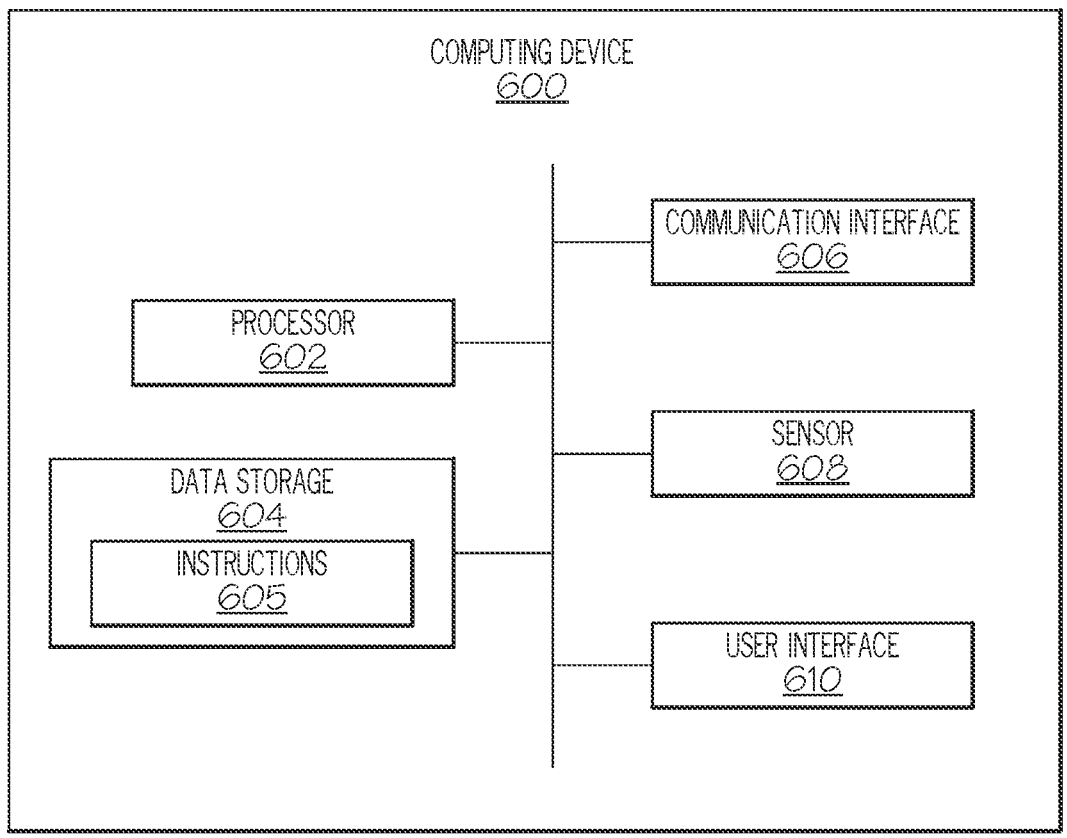
FIG. 6 illustrates a block diagram of a computing device, according to one or more embodiments shown and described herein.

FIG. 6 depicts a block diagram of a computing device, according to one or more embodiments shown and described herein. As shown, a computing device 600 may include a processor 602, and data storage 604 including instructions 605. The computing device may further include a communication interface 606, a sensor 608, and a user interface 610, each of which are communicatively connected via a system bus 612. Any component or combination of components of the disclosed embodiments may take the form of or include a computing device 600. It should be understood that computing device 600 may include different and/or additional components, and some or all of the functions of a given component could instead be carried out by one or more different components. Computing device 600 may take the form of (or include) a virtual computing device or one or more computing resources in a cloud computing environment. Additionally, computing device 600 could take the form of (or include) a plurality of computing devices of any form, and some or all of the functions of a given component could be carried out by any combination of one or more of the computing devices in the plurality.

Processor 602 may take the form of one or more general-purpose processors and/or one or more special-purpose processors, and may be integrated in whole or in part with data storage 604, communication interface 606, sensor 608, user interface 610, and/or any other component of computing device 600, as examples. Accordingly, processor 602 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 604 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 605 may be stored in data storage 604, and may include machine-language instructions executable by processor 602 to cause computing device 600 to perform the computing-device functions described herein. Additionally or alternatively, instructions 605 may include script instructions executable by a script interpreter configured to cause processor 602 and computing device 600 to execute the instructions specified in the script instructions. According to some embodiments, the instructions include instructions executable by the processor to cause the computing device to execute an artificial neural network. It should be understood that instructions 605 may take other forms as well.

Additional data may be stored in data storage 604, such as databases, data structures, data lakes, and/or network parameters of a neural network. The additional data could be stored such as a table, a flat file, data in a filesystem of the data storage, a heap file, a B+ tree, a hash table, a hash bucket, or any combination of these, as examples.

Communication interface 606 may be any component capable of performing the communication-interface functions described herein, including facilitating wired and/or wireless communication between computing device 600 and another entity. As such, communication interface 606 could take the form of an Ethernet, Wi-Fi, Bluetooth, and/or USB interface, among many other examples. Communication interface 606 may receive data over a network via communication links, for instance.

Sensor 608 could take the form of one or more sensors operable to perform any of the sensor functions described herein, including, but not limited to, any detectors or meters of the disclosed embodiments. The sensor could be positioned on a component of any of the embodiments described herein. Though sensor 608 may be referenced in the singular throughout this disclosure, it should be understood that sensor 608 may take the form of (or include) a single sensor or multiple sensors.

User interface 610 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 600. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 610 may take numerous other forms as well.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for identifying an anomaly in flow meter proving equipment, the system comprising:
   four detectors D1, D2, D3, and D4, wherein the detectors are arranged on a prover such that:
     a calibrated volume of the prover between D1 and D3 is base prover volume A (BPVA),
     a calibrated volume of the prover between D2 and D4 is base prover volume B (BPVB),
     a calibrated volume of the prover between D2 and D3 is base prover volume C (BPVC),
     a calibrated volume of the prover between D1 and D4 is base prover volume D (BPVD), and
     BPVA+BPVB−BPVC−BPVD=0;
   a data acquisition and monitoring system in communication with D1, D2, D3, and D4;
   wherein the data acquisition and monitoring system is configured to perform steps of:
     receiving signals from detectors D1, D2, D3 and D4 on a prover; using the received signals to:
     measure a flow volume between the detectors D1 and D3 as a measured volume Va;
     measure a flow volume between the detectors D2 and D4 as a measured volume Vb;
     measure a flow volume between the detectors D2 and D3 as a measured volume Vc;
     measure a flow volume between the detectors D1 and D4 as a measured volume Vd;

determining an upper range value by calculating Va+Vb−Vc−Vd plus a max uncertainty;

identifying an anomaly in response to the upper range value being less than zero; and initiating recalibration of the prover in response to the identifying of the anomaly, wherein:

an uncertainty Ua comprises a maximum expected difference between Va and BPVA;

an uncertainty Ub comprises a maximum expected difference between Vb and BPVB;

an uncertainty Uc comprises a maximum expected difference between Vc and BPVC;

an uncertainty Ud comprises a maximum expected difference between Vd and BPVD; and the max uncertainty comprises Ua+Ub+Uc+Ud.

2. The system of claim 1, wherein the data acquisition and monitoring system is further configured to perform steps of:

determining a lower range value by calculating Va+Vb−Vc−Vd minus the max uncertainty; and identifying an anomaly in response to the lower range value being greater than zero.

3. The system of claim 1, wherein each of Ua, Ub, Uc, and Ud comprises between 0.01% and 0.05% of the respective measured volumes Va, Vb, Vc, and Vd.

4. The system of claim 1, wherein the measuring of the measured volumes Va, Vb, Vc, and Vd comprises:

performing three or more measurements for each flow volume in a forward prover flow direction; and determining an average of the three or more measurements as the respective measured volumes Va, Vb, Vc, and Vd.

5. The system of claim 1, wherein the measuring of the measured volumes Va, Vb, Vc, and Vd comprises:

performing three or more measurements for each flow volume in a reverse prover flow direction; and determining an average of the three or more measurements as the respective measured volumes Va, Vb, Vc, and Vd.

6. A method for identifying an anomaly in flow meter proving equipment, the method comprising:

arranging detectors D1, D2, D3 and D4 on a prover such that:

a calibrated volume of the prover between D1 and D3 is base prover volume A (BPVA), a calibrated volume of the prover between D2 and D4 is base prover volume B (BPVB), a calibrated volume of the prover between D2 and D3 is base prover volume C (BPVC), a calibrated volume of the prover between D1 and D4 is base prover volume D (BPVD), and

BPVA+BPVB−BPVC−BPVD=0;

receiving signals from the detectors D1, D2, D3 and D4 on the prover;

using the received signals to:

measure a flow volume between the detectors D1 and D3 as a measured volume Va;

measure a flow volume between the detectors D2 and D4 as a measured volume Vb;

measure a flow volume between the detectors D2 and D3 as a measured volume Vc;

measure a flow volume between the detectors D1 and D4 as a measured volume Vd;

determining an upper range value by calculating Va+Vb−Vc−Vd plus a max uncertainty as an upper range value;

identifying an anomaly in response to the upper range value being less than zero; and initiating recalibration of the prover in response to the identifying of the anomaly, wherein:

an uncertainty Ua comprises a maximum expected difference between Va and BPVA;

an uncertainty Ub comprises a maximum expected difference between Vb and BPVB;

an uncertainty Uc comprises a maximum expected difference between Vc and BPVC:

an uncertainty Ud comprises a maximum expected difference between Vd and BPVD; and the max uncertainty comprises Ua+Ub+Uc+Ud.

7. The method of claim 6, further comprising steps of:

determining a lower range value by calculating Va+Vb−Vc−Vd minus the max uncertainty; and identifying an anomaly in response to the lower range value being greater than zero.

8. The method of claim 6, wherein each of Ua, Ub, Uc, and Ud comprises between 0.01% and 0.05% of the respective measured volumes Va, Vb, Vc, and Vd.

9. The method of claim 6, wherein the measuring of the measured volumes Va, Vb, Vc, and Vd comprises:

performing three or more measurements for each flow volume in a forward prover flow direction; and determining an average of the three or more measurements as the respective measured volumes Va, Vb, Vc, and Vd.

10. The method of claim 6, wherein the measuring of the measured volumes Va, Vb, Vc, and Vd comprises:

performing three or more measurements for each flow volume in a reverse prover flow direction; and determining an average of the three or more measurements as the respective measured volumes Va, Vb, Vc, and Vd.

11. A non-volatile computer readable medium storing instruction that, when executed by a processor, cause the processor to perform steps of:

receiving signals from detectors D1, D2, D3 and D4 on a prover;

using the received signals to:

measure a flow volume between the detectors D1 and D3 as a measured volume Va;

measure a flow volume between the detectors D2 and D4 as a measured volume Vb;

measure a flow volume between the detectors D2 and D3 as a measured volume Vc;

measure a flow volume between the detectors D1 and D4 as a measured volume Vd;

determining an upper range value by calculating Va+Vb−Vc−Vd plus a max uncertainty;

identifying an anomaly in response to the upper range value being less than zero; and initiating recalibration of the prover in response to the identifying of the anomaly, wherein:

an uncertainty Ua comprises a maximum expected difference between Va and a calibrated volume of the prover between detectors D1 and D3;

an uncertainty Ub comprises a maximum expected difference between Vb and a calibrated volume of the prover between D2 and D4;

an uncertainty Uc comprises a maximum expected difference between Vc and a calibrated volume of the prover between D2 and D3;

an uncertainty Ud comprises a maximum expected difference between Vd and a calibrated volume of the prover between D1 and D4; and the max uncertainty comprises Ua+Ub+Uc+Ud.

12. The non-volatile computer readable medium of claim 11, wherein the processor further performs steps of:
  determining a lower range value by calculating $V_a+V_b-V_c-V_d$ minus the max uncertainty as a lower range value; and
  identifying an anomaly in response to the lower range value being greater than zero.

13. The non-volatile computer readable medium of claim 11, wherein each of $U_a$, $U_b$, $U_c$, and $U_d$ comprises between 0.01% and 0.05% of the respective measured volumes $V_a$, $V_b$, $V_c$, and $V_d$.

14. The non-volatile computer readable medium of claim 11, wherein the measuring of the measured volumes $V_a$, $V_b$, $V_c$, and $V_d$ comprises:
  performing three or more measurements for each flow volume in a forward prover flow direction; and
  determining an average of the three or more measurements as the respective measured volumes $V_a$, $V_b$, $V_c$, and $V_d$.

15. The non-volatile computer readable medium of claim 11, wherein the measuring of the measured volumes $V_a$, $V_b$, $V_c$, and $V_d$ comprises:
  performing three or more measurements for each flow volume in a reverse prover flow direction; and
  determining an average of the three or more measurements as the respective measured volumes $V_a$, $V_b$, $V_c$, and $V_d$.

\* \* \* \* \*